United States Patent
Samuel (10) Patent No.: US 10,669,845 B2
(45) Date of Patent: Jun. 2, 2020

(54) TUBULAR WEAR VOLUME DETERMINATION USING STRETCH CORRECTION

(71) Applicant: Landmark Graphics Corporation, Houston, TX (US)

(72) Inventor: Robello Samuel, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 197 days.

(21) Appl. No.: 15/759,606

(22) PCT Filed: Oct. 29, 2015

(86) PCT No.: PCT/US2015/057985
§ 371 (c)(1),
(2) Date: Mar. 13, 2018

(87) PCT Pub. No.: WO2017/074380
PCT Pub. Date: May 4, 2017

(65) Prior Publication Data
US 2019/0041182 A1    Feb. 7, 2019

(51) Int. Cl.
*E21B 49/00* (2006.01)
*E21B 47/00* (2012.01)
*G01B 5/00* (2006.01)

(52) U.S. Cl.
CPC ............ *E21B 49/003* (2013.01); *E21B 47/00* (2013.01); *G01B 5/0021* (2013.01)

(58) Field of Classification Search
CPC ..... G01B 21/30; E21B 47/00; E21B 47/0006; E21B 49/00; E21B 49/003

USPC ............... 73/152.43, 152.46, 152.54, 152.57
See application file for complete search history.

(56) References Cited

U.S. PATENT DOCUMENTS

| | | | |
|---|---|---|---|
| 3,682,256 A | 8/1972 | Stuart | |
| 4,573,540 A | 3/1986 | Dellinger et al. | |
| 2005/0071120 A1* | 3/2005 | Hutchinson | E21B 44/00 702/150 |
| 2009/0164125 A1* | 6/2009 | Bordakov | E21B 47/04 702/6 |
| 2015/0176401 A1 | 6/2015 | Samuel et al. | |
| 2016/0231280 A1* | 8/2016 | Zwanenburg | E21B 47/00 |

FOREIGN PATENT DOCUMENTS

| WO | WO 2015/102633 A1 | 7/2015 |
|---|---|---|
| WO | WO 2015/152961 A1 | 10/2015 |

OTHER PUBLICATIONS

International Search Report and The Written Opinion of the International Search Authority, or the Declaration, Jul. 26, 2016, PCT/US2015/057985, 14 pages, ISA/KR.

* cited by examiner

*Primary Examiner* — Benjamin R Schmitt
(74) *Attorney, Agent, or Firm* — Haynes and Boone, LLP (57) ABSTRACT

Tubular stretch correction for different operational conditions is applied to determine tubular wear volume. The tubular stretch correction is applied as a function of a stretch factor comprising a varying shift factor, axial load on the tubular string, pressure effects on the tubular string, buckling of the tubular string and/or temperature effects on the tubular string. Stretch factors are taken into account to determine the correct position of wear factors along the casing string, which are ultimately used to determine the casing wear volume.

19 Claims, 6 Drawing Sheets

TUBULAR WEAR VOLUME DETERMINATION USING STRETCH CORRECTION

PRIORITY

The present application is a U.S. National Stage patent application of International Patent Application No. PCT/US2015/057985, filed on Oct. 29, 2015, the benefit of which is claimed and the disclosure of which is incorporated herein by reference in its entirety.

FIELD OF THE DISCLOSURE

The present disclosure relates generally to the field of hydrocarbon reservoirs and, more specifically, to techniques for reducing and/or eliminating casing wear during downhole operations.

BACKGROUND

To produce hydrocarbons from subterranean reservoirs, oilfield operators drill and case the borehole. When doing so, a shallow portion of the borehole may be cased to protect the water table from possible contamination by hydrocarbons and drilling fluids, whereas deeper portions of the borehole may be later cased as needed to facilitate the drilling process or completion of the well.

Each borehole is typically cased with a casing string, i.e., lengths of steel pipe threaded together and lowered into the borehole before being cemented in place. Despite being made of steel and secured by cement, casing strings can fail. Among the many factors that may contribute to casing failure is internal casing wear. The main cause of such casing wear is the frictional rubbing of other tubular strings on the inner surface of the casing string. For example, as a drill string moves and rotates inside a casing string, it rubs against the inner surface of the casing string, potentially reducing the wall thickness and thereby degrading the casing string's integrity and resistance to deformation.

Operators attempt to anticipate, and account for, casing wear when setting out suitable casing string specifications for each borehole. However, the estimation of wear volume often fails to match the actual measurements. Since these estimations are often inaccurate, they incur excess costs in two forms: overly thick casing walls due to unreasonably high safety margins, and downtime to address failures of casing integrity.

DESCRIPTION OF ILLUSTRATIVE EMBODIMENTS

Illustrative embodiments and related methods of the present disclosure are described below as they might be employed to determine tubular wear volume using a tubular stretch factor. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, illustrative embodiments and methods of the present disclosure apply a tubular stretch correction for different operational conditions to thereby determine the casing wear volume. The tubular stretch correction is applied as a function of a stretch factor comprising a varying shift factor, axial load on the tubular string, pressure effects on the tubular string, buckling of the tubular string and/or temperature effects on the tubular string. For example, as a drill string rotates inside the casing string during operation, operational conditions such as axial load, pressure, buckling and temperature all have individual and combined effects on the amount of stretch, and corresponding depth shift, of the drill string. If such stretch factors are not taken into account, the casing string position at which wear is determined will be inaccurate. Therefore, the methods described herein take those stretch factors into account to determine the correctly positioned wear factors along the casing string, which are ultimately used to determine the casing wear volume. By applying these stretch factors, the accuracy of the underlying contact forces between the drill string and casing string, as well as the resulting casing wear calculations, are greatly improved.

Although the present disclosure is described in relation to downhole applications using cased wellbores, the methods are equally applicable to other tubular strings such as, for example, a riser or any other tubular string in which another tubular string rotates or otherwise moves inside to produce like wear effects. Those ordinarily skilled in the art having the benefit of this disclosure realize there are a variety of alternative applications for the present disclosure.

It will also be apparent those ordinarily skilled persons that the embodiments, as described herein, can be implemented in many different embodiments of software, hardware, firmware, or a combination thereof and may be implemented in one or more computer systems or other processing systems. Any actual software code used for the specialized control of hardware to implement the methods is not limited to the detailed description. Thus, the operational behavior of embodiments will be described with the understanding that modifications and variations of the embodiments are possible, given the level of detail presented herein.

Figure 1:
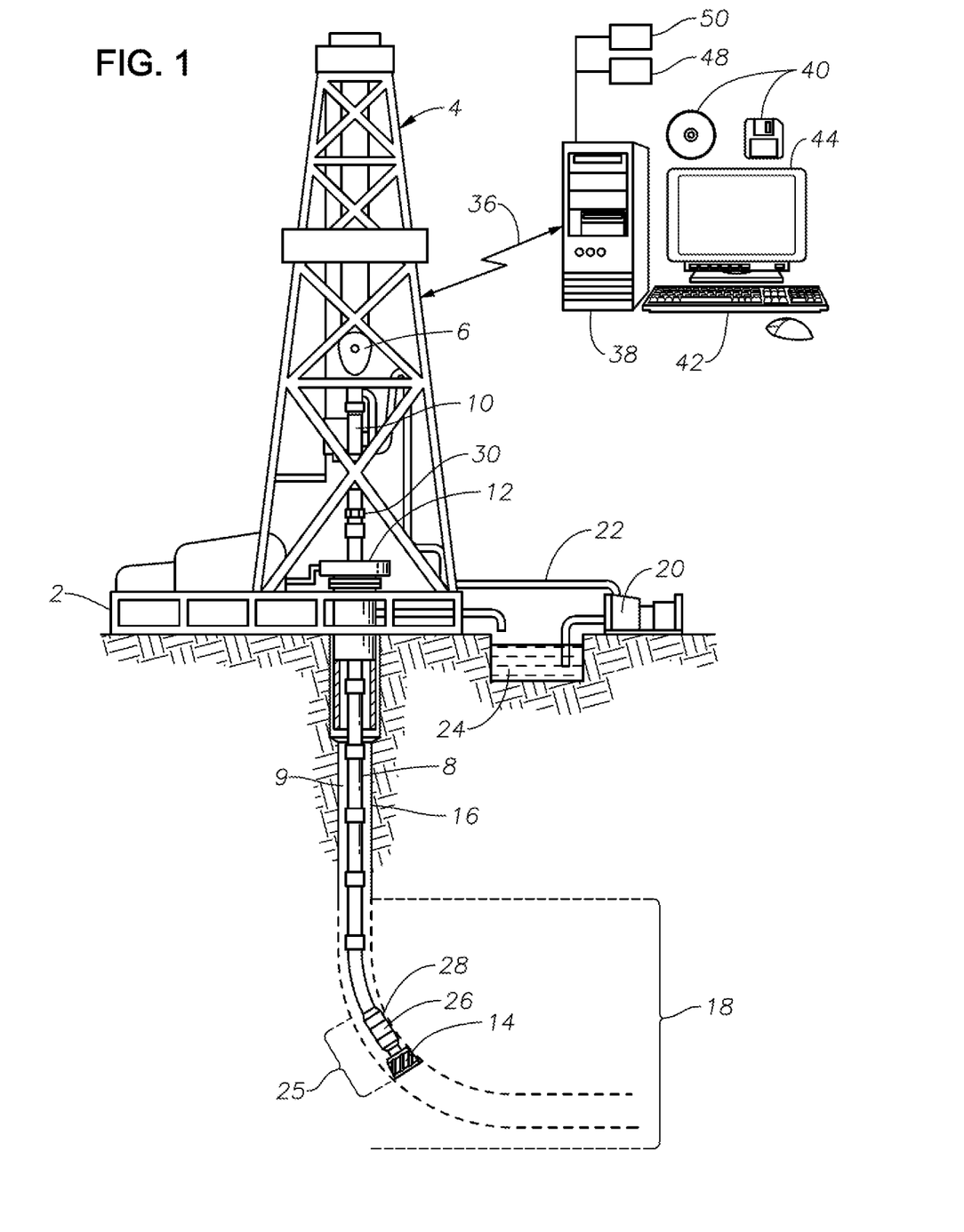
FIG. 1 shows a drilling environment in which the illustrative embodiments of the present disclosure may be practiced.

FIG. 1 shows a drilling environment in which the illustrative embodiments of the present disclosure may be practiced. In FIG. 1, a drilling rig platform 2 supports a derrick 4 having a traveling block 6 for raising and lowering a drill string 8. A drill string kelly 10 supports the rest of drill string 8 as it is lowered through a rotary table 12. Rotary table 12 rotates drill string 8, thereby turning drill bit 14. As drill bit 14 rotates, it creates a borehole 16 that passes through various formations 18. A pump 20 circulates drilling fluid through a feed pipe 22 to kelly 10, downhole through the interior of drill string 8, through orifices in drill bit 14, back to the surface via annulus 9 around drill string 8, and into a retention pit 24. The drilling fluid transports cuttings from borehole 16 into retention pit 24 and aids in maintaining the integrity of borehole 16. An upper portion of the borehole 16 is cased and the lower portion is open (uncased) borehole.

Drill bit 14 is just one piece of an open-hole logging-while-drilling ("LWD") assembly that includes a bottom-hole assembly 25 having one or more drill collars 26 and logging tool 28. Drill collars 26 are thick-walled steel pipe sections that provide weight and rigidity for the drilling process. Logging tool 28, which may be integrated into one of the drill collars, gathers measurements of various drilling or formation parameters. Illustrative drilling parameters include weight on bit, torque, and rate of penetration.

Measurements from logging tool 28 can be acquired by a telemetry sub (e.g., integrated with logging tool 28) to be stored in internal memory and/or communicated to the surface via a communications link. Mud pulse telemetry is one technique for providing a communications link for transferring logging measurements to a surface receiver 30 and for receiving commands from the surface, but other telemetry techniques can also be used. In accordance with at least some embodiments, measurements collected from logging tool 28 are processed by a computer 38 to produce one or more well logs for analysis. The contemplated logs include, for example, a tubular string wear log (e.g., casing string wear volume log).

The telemetry signals are supplied via a communications link 36 to the computer 38 or some other form of a data processing device. Computer 38 may include or be coupled to a non-transitory computer-readable medium (e.g., a hard-disk drive and/or memory) ("memory 48") and a processor 50 capable of executing instructions stored thereon. The memory 48 and processor 50 are coupled together by a bus which communicates data there between. Computer 38 operates in accordance with software (which may be stored on external non-transient information storage medium 40 and/or the memory 48) and user input via an input device 42 to process and decode the received signals. The resulting telemetry data may be further analyzed and processed by a processor 50 of computer 38 to generate a display of useful information on a computer monitor 44 or some other form of a display unit. For example, an operator could employ this system to obtain and monitor drilling parameters or formation properties.

Although not explicitly shown in FIG. 1, it will be recognized that computer 38 may be connected to one or more public and/or private networks via one or more appropriate network connections. Moreover, those ordinarily skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media, including any known memory storage devices. The present invention may therefore, be implemented in connection with various hardware, software or a combination thereof in a computer system or other processing system.

Still referring to FIG. 1, in at least some embodiments, a portion of wellbore 16 is cased. Memory 40, 48 of computer 38 includes a casing wear volume determination program which, when executed by processor 50, determines a casing wear volume along the inner wall of the casing using one or more stretch factors. Thus, computer 38 may also be referred to as a casing wear volume determination unit. A wear factor is determined and/or adjusted based upon its corresponding stretch factor at that location along the casing string. The system further determines, based at least in part on the determined/adjusted wear factor, the casing string wear volume as a function of position along the casing string (i.e., wear factor distribution), and may present the corresponding distributed casing wear volume to a user via a display unit, such as computer monitor 44.

As described herein, the casing wear volume determination unit determines the casing wear factor using one or more stretch factors. In certain illustrative methods, a stiff string and/or finite element model is employed to determine the wear factor. The stretch factor is determined using a varying shift factor, an axial load applied to the tubular string, pressure effects on the tubular string, buckling of the tubular string, or temperature effects on the tubular string. After the wear factor is determined using the stretch factor, the casing wear volume is determined or updated based upon prior stretch factors.

Figure 2A:
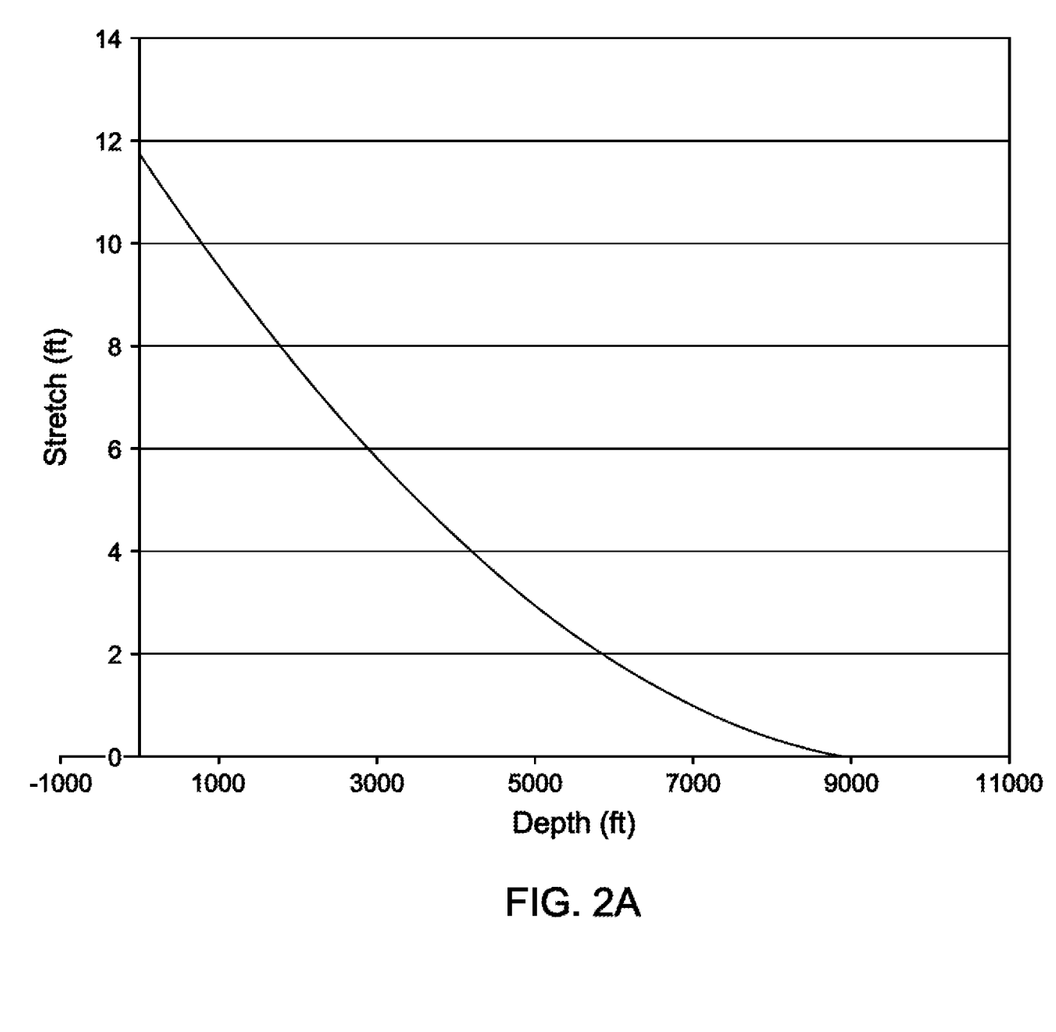
FIGS. 2A and 2C are graphs plotting tubular stretch per wellbore depth for different wellbores, and are useful to illustrate certain illustrative methods of the present disclosure.

FIG. 2A is a graph plotting tubular stretch per wellbore depth, and is useful to illustrate certain illustrative methods of the present disclosure. The illustrative methods described herein provide for the inclusion of the stretch in casing wear modeling, which results in the accurate determination of casing wear volume in the longitudinal direction. In contrast, conventional casing wear determination is based on a static model that does not consider tubular stretch, which leads to longitudinal depth shift inaccuracies in the resulting casing wear modeling. Since the position of the casing/drill string contact points are inaccurate (because stretch is not considered), the cumulative wear along the casing string will also be wrong.

Figure 2B:
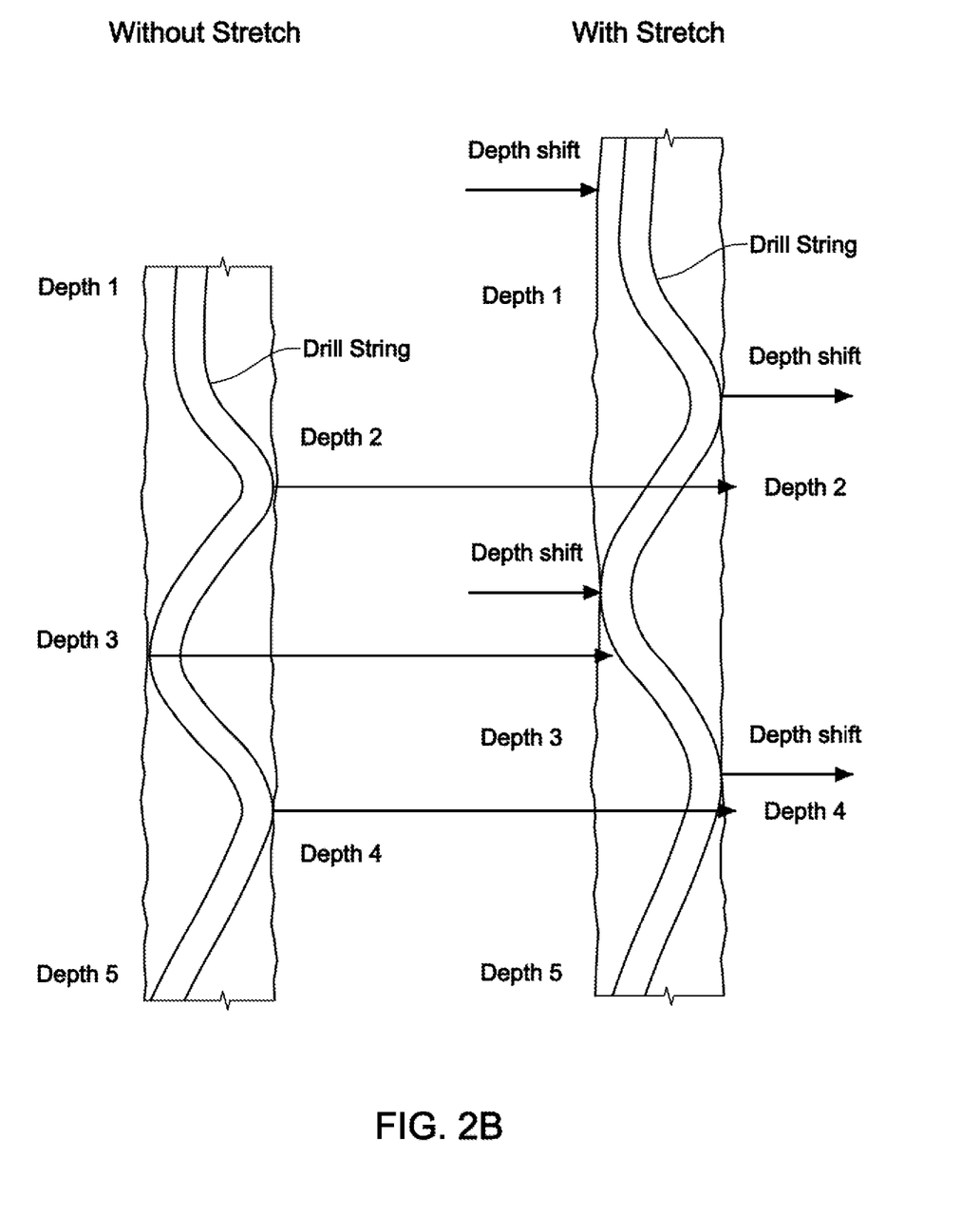
FIG. 2B illustrates the depth shifts along a wellbore by comparing a drill string without (left) and with (right) stretch.

FIG. 2B illustrates the depth shifts along a wellbore by comparing a drill string without (left) and with (right) stretch. Thus, without the stretch correction, the depth inaccuracies will be more pronounced at the top of the drill string as compared to the bottom, as illustrated by FIGS. 2A and 2B. The X axis shows the depth of the drill string in the well in feet, while the Y axis shows the amount of stretch of the drill string in feet. As can be seen, the maximum amount of stretch is present at the top of the well (~12 feet of stretch), while the stretch is lowest at the bottom of the drill string at roughly 9,000 feet terminal depth. Zero depth may refer to, for example, sea level, the wellhead or mudline, while the terminal depth is the bottom of the well or at/near the drill bit.

Figure 2C:
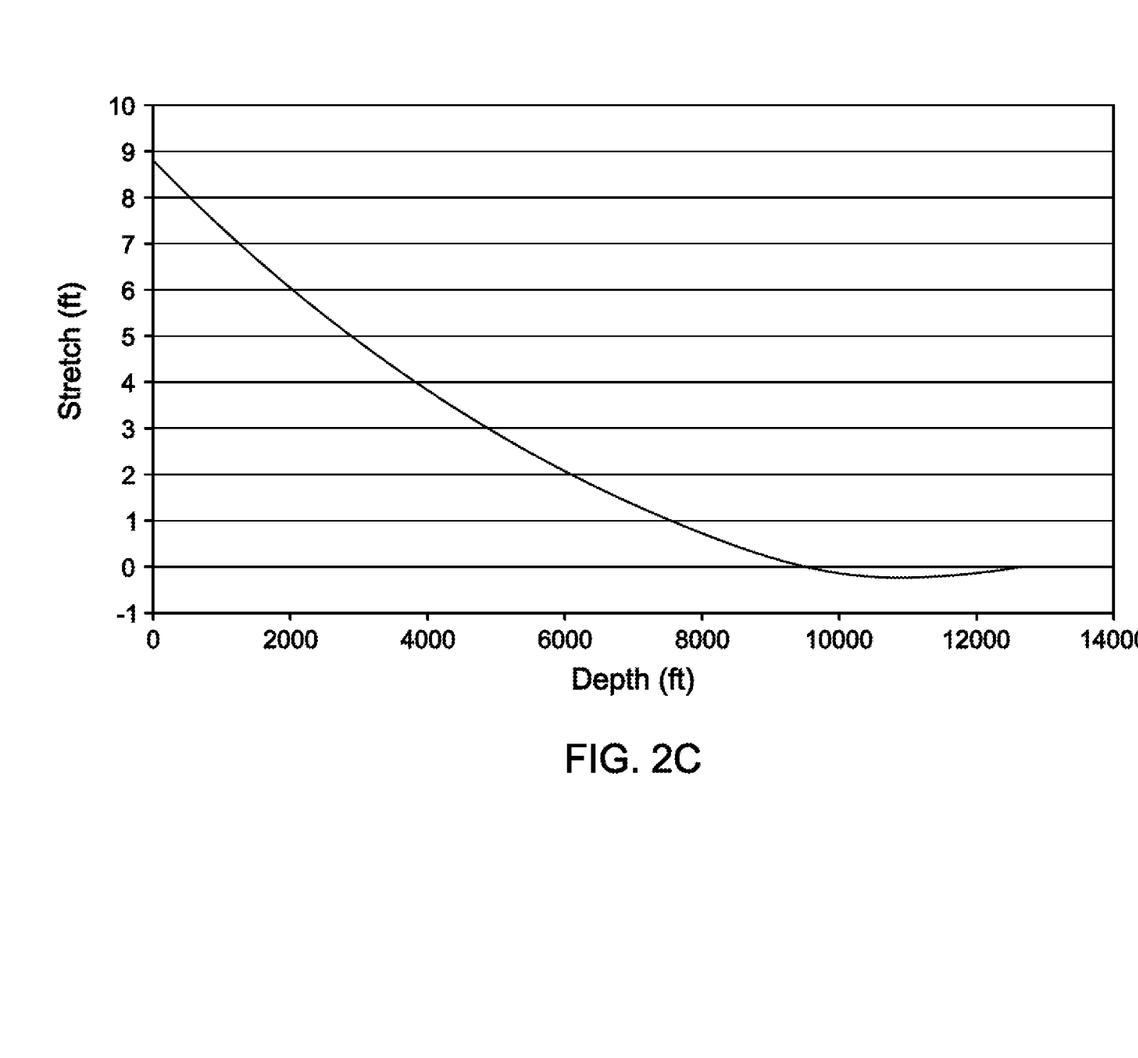

FIG. 2C is a graph plotting tubular stretch per wellbore depth, and is also useful to illustrate certain illustrative methods of the present disclosure. FIG. 2C is different from FIG. 2A in that FIG. 2C plots a more horizontal well. Again, as can be seen, the stretch is more pronounced at the top of the drill string, while the stretch changes little along the horizontal portion of the well. Furthermore, it can be seen there will be a compressional stretch (i.e., negative stretch) in addition to the positive stretch (normally considered as stretch), due to the weight on the bit at the bottom.

As can be seen in FIGS. 2A-2C, various situations exist in which the original wellbore positions and the depth of the casing wear may be masked for different operating conditions. As a result, the wear volume determination will be skewed, especially is dealing with a long string, as is the position may be off more than by 10% depending on the depth of the well. Therefore, as will be described below, various stretch factors are utilized herein to determine the tubular wear volume. The total stretch or total elongation of the drill string consists of four components: stretch due to axial force, stretch due to pressure effect (ballooning), stretch due to buckling, and stretch due to temperature changes.

In a first illustrative method, however, the stretch factor is applied as a varying shift factor. With reference to FIGS. 2A and 2C, a varying shift factor can be determined and applied to calculate the wear volume in certain illustrative methods of the present disclosure. The varying shift factor can be determined using plots such as those illustrated in FIGS. 2A and 2C. The varying shift factor reduces the computation time required to determine the stretch factor in other illustrative embodiments described herein. In certain illustrative methods, the varying shift factor is determined using:

$$y - c = c \cosh \frac{x}{c} - c, \quad \text{Eq. (1)}$$

where y is the axis stretch in feet, x is the axis depth of the well in feet, cos h is the hyperbolic sine, and c is the parameter of the catenary. The stretch factor takes the form given in Eq 1, and will be determined based upon, for example, FIGS. 2A and 2C.

In other illustrative methods, as mentioned previously, the stretch factors herein are applied as a function of axial load, pressure, buckling or temperature applied to the inner casing string (e.g., drill string). The resulting length change can be calculated using:

$$\Delta L_{stretch} = \Delta L_a + \Delta L_p + \Delta L_b + \Delta L_t \quad \text{Eq. (2)},$$

where $\Delta L_{stretch}$ is a cumulative length change due to stretch factors; $\Delta L_a$ is length change due to the axial load stretch factor; $\Delta L_p$ is the length change due to the pressure induced stretch factor; $\Delta L_b$ is the length change due to the buckling induced stretch factor; and $\Delta L_t$ is the length change due to the temperature induced stretch factor. In certain illustrative methods, after each stretch factor is calculated as described below, the resulting length change may be combined to determine the cumulative length change of the drill string. However, in alternative methods, the factors may be applied alone or combined as otherwise desired during modeling.

The calculation of the elongation due to the axial load (i.e., axial load induced stretch factor) is based on Hooke's Law. Hooke's Law consists of the change in the length due to the constant load in the drill string and the change in length due to the linear change in the axial load. $\Delta L_a$ is given by:

$$\Delta L_a = \frac{F_T \times L}{A \times E} + \frac{\Delta F_T \times L}{2 \times A \times E}, \quad \text{Eq. (3)}$$

where $F_T$ is the true tension, axial force acting at the point of reference and is determined by the pressure area method; $\Delta F$ is the change in pressure area axial force over the component length; A is the cross sectional area of the component; and E is Young's modulus of the component material. In another method, the elongation of the string is due to the differential pressure inside and outside of the workstring (i.e., pressure induced stretch factor or ballooning), and is given by the following equation:

$$\Delta L_p = \frac{-v \times L_p}{E \times (R^2 - 1)} \times [(\rho_s - R^2 \times \rho_a) \times L + 2 \times (P_s - R^2 \times P_a)], \quad \text{Eq. (4)}$$

where $\Delta L_p$ is the change in length due to ballooning effects; $L_p$ is the length of the workstring component element; R is the ratio of the component outside diameter to the inside diameter; E is Young's modulus of the component material; v is Poisson's ratio of the component material; $\rho_s$ is the mud density inside the workstring component; $\rho_a$ is the mud density in the annulus at the depth of the workstring component; $P_s$ is the surface pressure on the drill string side; and $P_a$ is the surface pressure on the annulus side.

In another illustrative method, the buckling "strain", in the sense of Lubinski, is the buckling length change per unit length. The buckling strain (i.e., buckling induced stretch factor) is given by the following relationship:

$$e_b = \frac{1}{2}(r\theta') \quad \text{Eq.(5)},$$

For the case of lateral buckling, the actual shape of the θ' curve is integrated numerically to obtain the following relationship:

$$e_{bavg} = -.7285 \frac{r^2}{4EI} F_b^{.08} (F_b - F_p)^{.92}, \quad \text{Eq. (6)}$$

for 2.8 Fp>Fb>Fp. This may be compared with the helical buckling strain given by:

$$e_b = -\frac{r^2}{4EI} F_b, \quad \text{Eq. (7)}$$

for Fb>2.8 Fp. The lateral buckling strain is roughly half the conventional helical buckling strain.

To determine the buckling length change $\Delta L_b$, it is necessary to integrate Equations 6 and 7 over the appropriate length interval:

$$\Delta L_b = \int_{z1}^{z2} e_b dz, \quad \text{Eq. (8)}$$

Here, z1 and z2 are defined by the distribution of the buckling force F. For the general case of arbitrary variation of $F_b$ over the interval $\Delta L = z2-z1$, Equation 8 must be numerically integrated. However, there are two special cases that are commonly used. For the case of constant force $F_b$, such as in a horizontal well, Equation 8 is integrated as follows:

$$\int_{z1}^{z2} e_b dz = e_b \Delta L. \quad \text{Eq. (9)}$$

Here, $e_b$ is defined by either Equation 7 0.3.75 or Equation 9. The second special case is for a linear variation of $F_b$ over the interval such that:

$$F_b(z) = wz + c \qquad \text{Eq.(10)}$$

The length change is given for this case by:

$$\Delta L_b = \frac{-r^2}{4EIw}(F_2 - F_p)[.3771 F_2 - .3668 F_p], \qquad \text{Eq. (11)}$$

for 2.8 $F_p > F_2 > F_p$ and $$\Delta L_b = -\frac{r^2}{8EIw}[F_2^2 - F_1^2], \qquad \text{Eq. (12)}$$

for $F > 2.8\ F_p$.

In yet another illustrative method, the thermal induced stretch (i.e., temperature induced stress factor) can be given by the following equation:

$$\Delta L_t = L\alpha \Delta t \qquad \text{Eq.(13),}$$

where $\alpha$ is the coefficient of thermal expansion defined as the fractional increase in length per unit rise in temperature, with units of in/in/F (with values of $6.9 \times 10^{-6}$ for steel, $10.3 \times 10^{-6}$ for Aluminum and $4.9 \times 10^{-6}$ for titanium); and $\Delta t$ is the average temperature change in degrees F. More accurately, the thermal induced stretch can be given in integral form by:

$$\Delta L_t = \int_0^L L\alpha \Delta t(\xi)d\xi, \qquad \text{Eq. (14)}$$

where $\xi$? is a variable of length. Assuming a linear variation of temperature along the wellbore as:

$$\Delta t(z) = \Delta t_0 + \frac{\Delta t}{\Delta z} z,$$

Equation 13 can be written as:

$$\Delta L_t = \alpha \left[ \Delta t_0 + \frac{\Delta t}{\Delta z} \frac{L^2}{2} \right] \qquad \text{Eq. (15)}$$

where z is the measured depth; and $\Delta L$ is the measured calculation interval.

Figure 3:
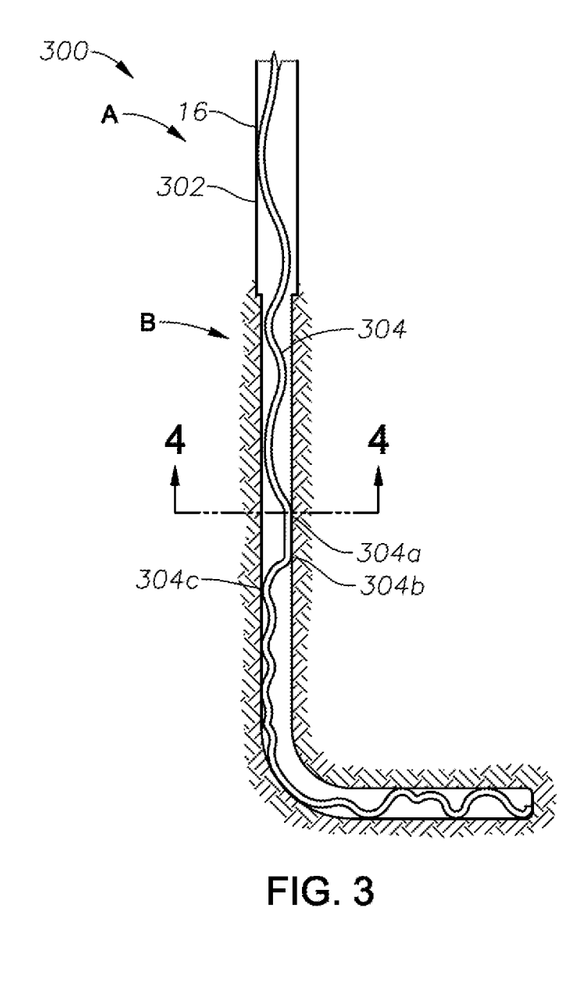
FIG. 3 shows a cross-sectional view of a portion of a cased well, according to certain illustrative embodiments of the present disclosure.

FIG. 3 shows a cross-sectional view of a portion of an illustrative cased well 300, according to certain illustrative embodiments of the present disclosure. The well 300 includes wellbore 16 having a casing string 302 running through a first cased portion A and a second cased portion B. In some wells, casing string 302 may have a larger diameter in cased portion A than in cased portion B. The variance in casing string diameter, thickness and type may affect the rate of wear of the casing string. As can be seen in FIG. 3, drill string 304 has more stretch towards the top, and negative stretch (i.e., compression) at the bottom.

Within the casing string 302 is drill string 304 whose location may be determined via simulation in certain embodiments. The simulation may determine the location of the drill string 304 by, e.g., modeling the casing string geometry and simulating the insertion of the drill string into the casing. The simulation may employ, for example, a finite element analysis or a set of equations for a "stiff string" model. Three distinct contact points 304a-c of drill string 304 are identified in FIG. 3 and illustrated in greater detail in FIG. 4. For these contact points 304a-c, and indeed for each position along the casing string, illustrative embodiments of the present disclosure determine the casing wear volume using stretch factors at contact points 304a-c.

Figure 4:
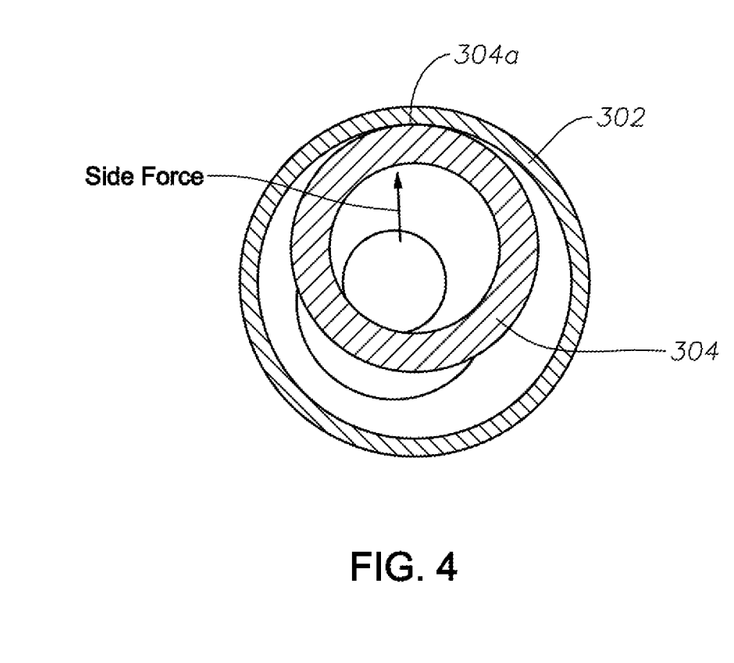
FIG. 4 is a top-down view of the drill string arranged within the casing string, along line 4-4 of FIG. 3.

FIG. 4 is a top-down view of the drill string 304 arranged within casing string 302, along line 4-4 of FIG. 3. Drill string 304 may be, for example and without limitation, a coiled tubing, additional casing or some other tubular string. Moreover, in alternate embodiments, casing string 302 may be a variety of other tubulars such as, for example, a riser utilized in deep water applications. As can be seen, drill string 304 is in contact with casing string 302 at contact point 304a. As drill string 304 rotates during operation, a side force is applied to casing string 302 at contact point 304a, friction is created between drill string 304 and casing string 302 at contact point 204a, pressure and axial loading are applied to drill string 304, and there is a defined temperature at contact point 304a—all of which have a singular and combined effect on the stretching of drill string 304. As discussed herein, illustrative methods of the present disclosure accounts for such phenomena in the form of a stretch factor, ultimately used to determine the is casing wear volume.

Figure 5:
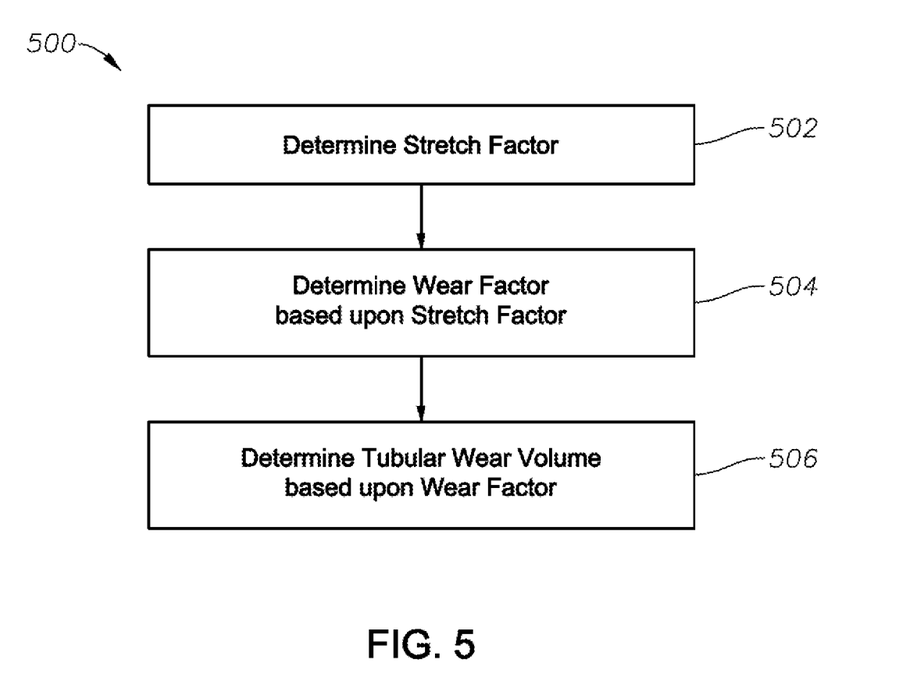
FIG. 5 is a flow chart of a tubular wear volume method, according to certain illustrative methods of the present disclosure.

FIG. 5 is a flow chart of an illustrative tubular wear volume method 500 of the present disclosure. The method 500 may be implemented by a computer system having a program stored on a non-transient computer readable medium and executed by a processor to determine the tubular wear volume using a stretch factor, such as the computer 38, memory 48, and processor 50 described above in FIG. 1. At block 502, a stretch factor for an inner tubular string (positioned inside an outer tubular string) is determined by the processor using one or more stretch factors (e.g., varying shift factor, axial load induced factor, etc.) described above. The stretch factors are determined for a selected operation, such as, for example, a drilling or pull-out operation. In this example, the first stretch factor is calculated at depth 0, in which the processor determines the change in length $\Delta L$ as described above. Once the length displacement is determined, the correct position at which to calculate casing wear is known.

At block 504, a wear factor is determined at the correct position along the casing string determined at block 502. The wear factor is a function of the side force from the drill string components and rotation of the drill string, as will be understood by those ordinarily skilled in the art having the benefit of this disclosure. In certain methods, the wear factor may be a static number, while in other methods the wear factor may be determined based upon one or more other phenomena such as, for example, friction or temperature.

At block 506, the tubular wear volume is determined using the wear factor. In certain illustrative methods, the casing wear volume is given as:

$$V = \frac{\eta}{H_b} \int \mu F_n L dl = f_W \int \mu F_n L dl, \qquad \text{Eq. (16)}$$

where V=casing wear volume (volume of metal removed by wear in m$^3$; $\eta$ is wear efficiency; $H_b$ is casing Brinell hardness; $\mu$ is the friction factor; $F_n$ is the side force factor; L is distance slid (which can be fixed or take stretch into account); dl is differential element length (which may also take stretch into account); and $f_W$ is the wear factor determined at the correct position using the stretch factor. Further application of Equation 16 will not be provided herein, as would be readily understood by those ordinarily skilled in the art having the benefit of this disclosure.

Once the casing wear volume is determined at the corrected position along the casing, the processor then determines the next depth at which to determine casing wear. These depth increments may be defined as desired, such as, for example, every foot, 3 feet, etc. If the processor determines there are more depths to investigate, the method loops back to block 502 where the process is conducted again at that depth. This continues iteratively until the casing wear is modeled at all desired positions along the casing string, in which the positions are determined using stretch factors (both positive and negative stretch factors). Toward the top of the drill string, a positive stretch factor will be employed, while toward the bottom of the casing string, a negative stretch factor will be employed—in the example wellbore illustrated in FIG. 3. Once the casing wear is determined for the first operation, further operations may be selected and its corresponding casing wear determined.

Thereafter, in certain embodiments, the determined casing wear volume may be integrated into a model based upon the operation and rotation of the drill string. A wear factor distribution (or casing wear volume distribution, for example) may then be generated and displayed by the system. For example, at various contact points along the casing string, the wear volume may be determined using various modeling techniques. Thereafter, the system may store or display the distributed casing wear volumes in graphical form or otherwise on a display unit.

The methods described herein may be applied in the planning stages of a wellbore, during a real-time operation, or during post operation analysis. If used in the planning stage, a drill string may be designed based upon the casing wear volume analysis. If used in real-time, a drill string operation may be altered based upon the wear volume calculations. In such applications, for example, as the drill string moves along the borehole, the wear may be continually adjusted based on the real time application of the stretch factors. If used in post analysis, future operations or workstrings may be designed based upon the wear volume data.

Accordingly, the illustrative embodiments described herein provide accurate determination of casing wear volume by accounting for tubular stretch due to various factors. By considering the effects of tubular stretch, casing wear is predicted with improved accuracy because the position of survey/contact points is correctly determined. The resulting improved wear distribution obtained for a given operation will help to reduce the wear by optimizing the drill string design and replacing components that cause maximum wear. Moreover, the improved casing wear determination will reduce over designing the casing, prevent failures, and save costs.

Embodiments of the present disclosure described herein further relate to any one or more of the following paragraphs:

1. A method for determining tubular wear volume, the method comprising determining a stretch factor of an inner tubular string positioned inside an outer tubular string; determining a wear factor along the outer tubular string based upon the stretch factor; and determining the tubular wear volume based upon the wear factor.

2. The method as defined in paragraph 1, wherein determining the stretch factor comprises determining a positive stretch factor along the inner tubular string; or determining a negative stretch factor along the inner tubular string, the negative stretch factor being a compression of the inner tubular string.

3. The method as defined in paragraphs 1 or 2, wherein determining the stretch factor comprises determining a varying shift factor for the inner tubular string.

4. The method as defined in any of paragraphs 1-3, wherein determining the stretch factor comprises determining the stretch factor due to an axial load applied to the inner tubular string.

5. The method as defined in any of paragraphs 1-4, wherein determining the stretch factor comprises determining the stretch factor due to pressure effects on the inner tubular string.

6. The method as defined in any of paragraphs 1-5, wherein determining the stretch factor comprises determining the stretch factor due to buckling of the inner tubular string.

7. The method as defined in any of paragraphs 1-6, wherein determining the stretch factor comprises determining the stretch factor due to temperature effects on the inner tubular string.

8. The method as defined in any of paragraphs 1-7, further comprising designing a drill string based upon the tubular wear volume.

9. The method as defined in any of paragraphs 1-8, further comprising adjusting a drilling operation in real-time based upon the tubular wear volume.

10. The method as defined in any of paragraphs 1-9, wherein the outer tubular string is a casing string or riser.

11. A method for determining tubular wear volume, the method comprising applying a tubular stretch correction to thereby determine the tubular wear volume.

12. The method as defined in paragraph 11, wherein applying the tubular stretch correction comprises determining a stretch factor of an inner tubular string positioned inside an outer tubular string; determining a wear factor along the outer tubular string based upon the stretch is factor; and determining the tubular wear volume based upon the wear factor.

13. The method as defined in paragraphs 11 or 12, wherein determining the stretch factor comprises determining a positive stretch factor or determining a negative stretch factor, the negative stretch factor being a compression of the inner tubular string.

14. The method as defined in any of paragraphs 11-13, wherein determining the stretch factor comprises determining the stretch factor based upon one or more of an axial load applied to the inner tubular string; pressure effects on the inner tubular string; buckling of the inner tubular string; or temperature effects on the inner tubular string.

15. The method as defined in any of paragraphs 11-14, further comprising designing a drill string based upon the tubular wear volume.

16. The method as defined in any of paragraphs 11-15, further comprising adjusting a drilling operation in real-time based upon the tubular wear volume.

17. The method as defined in any of paragraphs 11-16, wherein the outer tubular string is a casing string or riser.

18. The method as defined in any of paragraphs 11-17, further comprising displaying the tubular wear volume on a display unit.

19. A system comprising processing circuitry to implement any of methods of paragraphs 1-18.

20. A drilling system, comprising a drilling rig that drives a drill string inside a wellbore that is at least partially cased by a casing string; and a casing wear volume determination unit coupled to the drilling rig to receive drilling parameters and responsively perform any of the methods defined in paragraphs 1-18.

21. A casing wear volume determination unit comprising processing circuitry to implement any of the methods defined in paragraphs 1-18.

Moreover, the foregoing paragraphs and other methods described herein may be embodied within a system comprising processing circuitry to implement any of the methods, or a in a non-transitory computer-program product comprising instructions which, when executed by at least one processor, causes the processor to perform any of the methods described herein.

Although various embodiments and methods have been shown and described, the present disclosure is not limited to such embodiments and methodologies and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A method for determining tubular wear volume, the method comprising:
    determining a stretch factor of an inner tubular string positioned inside an outer tubular string;
    determining a wear factor along the outer tubular string based upon the stretch factor; and
    determining the tubular wear volume based upon the wear factor, the tubular wear volume being an amount of outer tubular string material removed by wear caused by the inner tubular string,
    wherein the tubular wear volume is used to perform a downhole operation.

2. The method as defined in claim 1, wherein determining the stretch factor comprises:
    determining a positive stretch factor along the inner tubular string; or
    determining a negative stretch factor along the inner tubular string, the negative stretch factor being a compression of the inner tubular string.

3. The method as defined in claim 1, wherein determining the stretch factor comprises:
    determining a varying shift factor for the inner tubular string;
    determining the stretch factor due to an axial load applied to the inner tubular string;
    determining the stretch factor due to pressure effects on the inner tubular string; or
    determining the stretch factor due to buckling of the inner tubular string.

4. The method as defined in claim 1, wherein determining the stretch factor comprises determining the stretch factor due to temperature effects on the inner tubular string.

5. The method as defined in claim 1, further comprising designing a drill string based upon the tubular wear volume.

6. The method as defined in claim 1, further comprising adjusting a drilling operation in real-time based upon the tubular wear volume.

7. The method as defined in claim 1, wherein the outer tubular string is a casing string or riser.

8. A system comprising processing circuitry to implement the method of claim 1.

9. A non-transitory computer-readable storage medium having computer-readable instructions stored thereon, which when executed by at least one processor causes the processor to perform the method defined in claim 1.

10. A drilling system, comprising:
    a drilling rig that drives a drill string inside a wellbore that is at least partially cased by a casing string; and
    a casing wear volume determination unit coupled to the drilling rig to receive drilling parameters and responsively perform the method defined in claim 1.

11. A casing wear volume determination unit comprising processing circuitry to implement the method defined in claim 1.

12. A method for determining tubular wear volume, the method comprising applying a tubular stretch correction to thereby determine the tubular wear volume, wherein;
    the tubular stretch correction is based on a stretch factor and wear factor; and
    the tubular wear volume is an amount of outer tubular string material removed by wear caused by an inner tubular string, the tubular wear volume being used to perform a downhole operation.

13. The method as defined in claim 12, wherein applying the tubular stretch correction comprises:
    determining the stretch factor of the inner tubular string positioned inside the outer tubular string;
    determining the factor along the outer tubular string based upon the stretch factor; and
    determining the tubular wear volume based upon the wear factor.

14. The method as defined in claim 13, wherein determining the stretch factor comprises:
    determining a positive stretch factor; or
    determining a negative stretch factor, the negative stretch factor being a compression of the inner tubular string.

15. The method as defined in claim 12, wherein determining the stretch factor comprises determining the stretch factor based upon one or more of:
    an axial load applied to the inner tubular string;
    pressure effects on the inner tubular string;
    buckling of the inner tubular string; or
    temperature effects on the inner tubular string.

16. The method as defined in claim 12, further comprising designing a drill string based upon the tubular wear volume.

17. The method as defined in claim 12, further comprising adjusting a drilling operation in real-time based upon the tubular wear volume.

18. The method as defined in claim 12, wherein the outer tubular string is a casing string or riser.

19. The method as defined in claim 12, further comprising displaying the tubular wear volume on a display unit.

* * * * *